April 27, 1937.  G. KIELMANSEGG  2,078,764
NONSKID DEVICE FOR VEHICLE WHEELS
Filed March 24, 1934   2 Sheets-Sheet 1
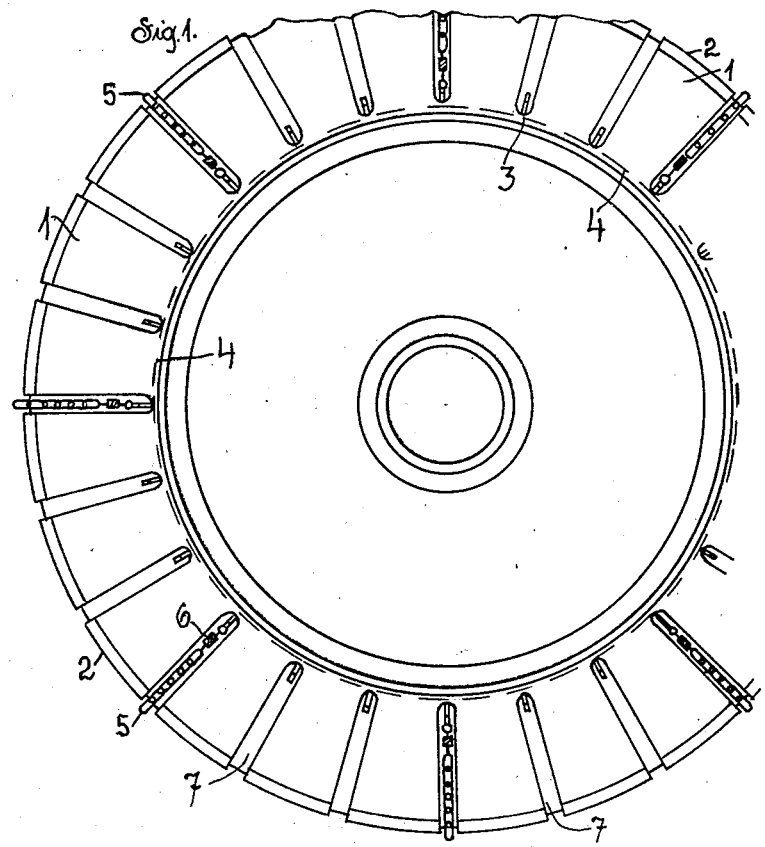
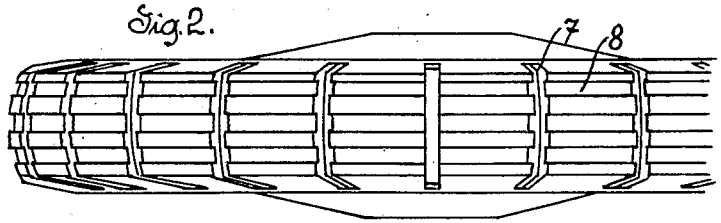
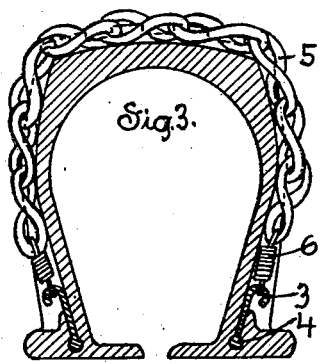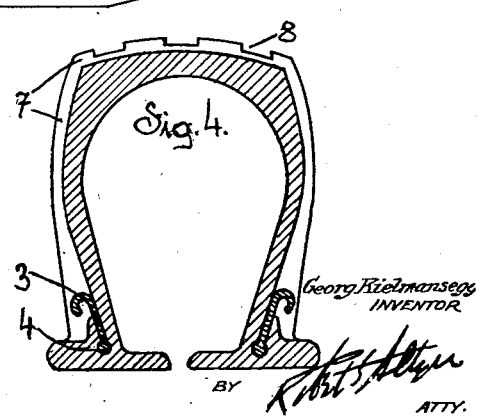
Georg Kielmansegg
INVENTOR
BY
ATTY.

April 27, 1937.  G. KIELMANSEGG  2,078,764
NONSKID DEVICE FOR VEHICLE WHEELS
Filed March 24, 1934  2 Sheets-Sheet 2
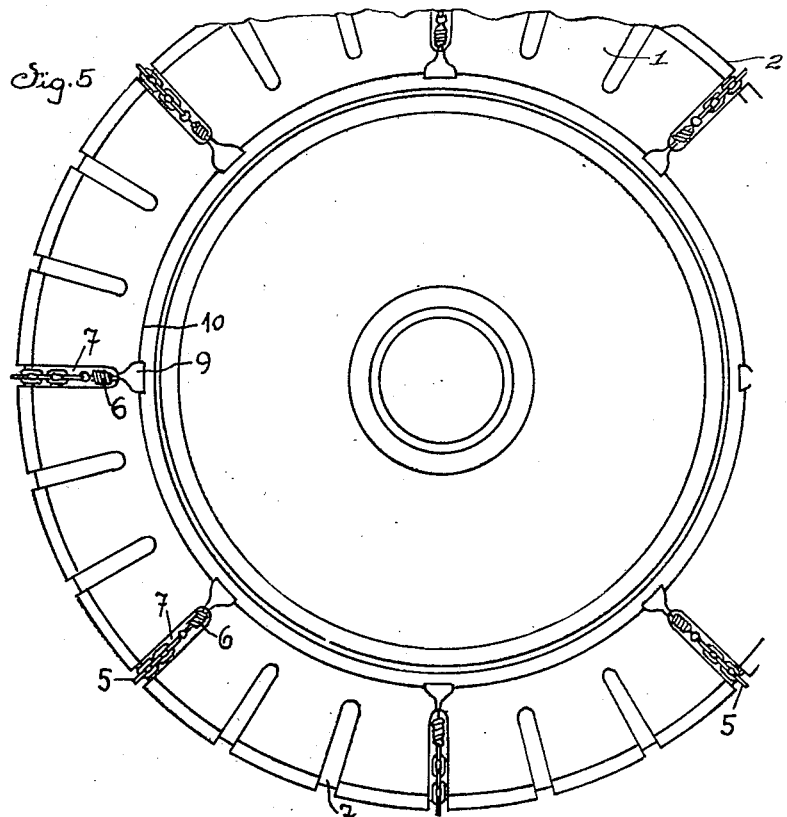
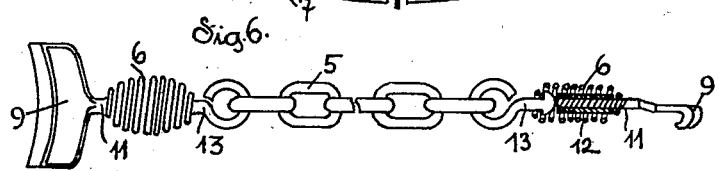
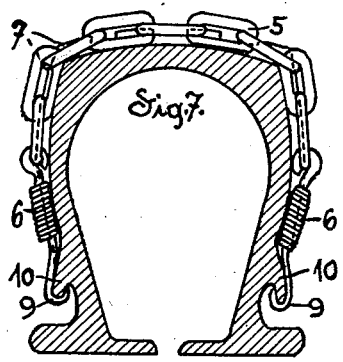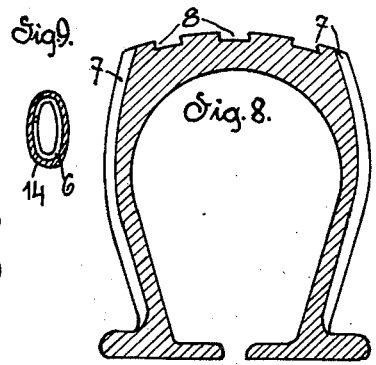
INVENTOR
Georg Kielmansegg
BY
ATTY.

Patented Apr. 27, 1937

2,078,764

UNITED STATES PATENT OFFICE 2,078,764

NON-SKID DEVICE FOR VEHICLE WHEELS

Georg Kielmansegg, Maria-Enzersdorf, near Vienna, Austria

Application March 24, 1934, Serial No. 717,160
In Austria April 3, 1933

6 Claims. (Cl. 152—14)

This invention relates to a device the object of which is to improve the fitting of so-called snow-chains to pneumatic tyres, solid rubber tyres and all other kinds of wheel tyres.

Especially in the case of automobile vehicles for passengers and goods the method hitherto practised of fitting snow-chains as non-skid means has presented a number of disadvantages. The snow chains not merely injure the tyre covers or solid rubber tyres but also have very heavy wear, and therefore a short life, owing to the fact that they are so fitted outside the wheel tyres as to be free on all sides. They are moreover subject to very frequent breakage, in consequence of the method in which they are fitted, owing to the tensile action to which they are exposed. This then involves either the changing of the entire chain or else a comparatively expensive repair.

The idea of the invention consists essentially in the fact that the chains, not in the form of a long unitary chain, but in the form of a plurality of short chains independent of one another are embedded in grooves arranged in the wheel tyre, so that they are protected against displacement and project far enough beyond the outer surface of the wheel tyre to engage sufficiently in the snow, sand or dust. By the selection of short chains and the method in which they are fitted their durability and that of the wheel tyre is lengthened, the mounting and de-mounting of the chains is considerably facilitated and simplified, and in the case of injuries occurring only short chains always have to be changed, which can be effected easily and at low cost.

In order to attain the best effect it is advisable to apply the chains exactly or substantially transversely to the peripheral direction of the tyre.

The wheel tyre, that is, particularly the tyre cover in the case of a pneumatic tyre, or the tyre itself in the case of a solid rubber tyre, is provided, for the purpose of supporting the chains on the tread surface or on the side surfaces or on both, with spaced grooves, which in the first case extend transversely or obliquely in relation to the peripheral direction of the tyre and in the second case extend radially or obliquely.

The ends of the chains may advantageously be secured to hooks or hook-like projections on the tyre cover or solid rubber tyre, preferably with the interposition of tension springs.

Various constructional examples of the invention are illustrated in the accompanying drawings, in which Figure 1 shows a wheel with a pneumatic tyre in side elevation, with chains fitted thereto.

Figure 2 shows the wheel in plan without the chains,

Figure 3 shows a cross section through the tyre cover with a chain mounted thereon, and Figure 4 shows the same cross section without the chain.

Figure 5 shows a second constructional form of the wheel in side elevation,

Figure 6 shows a chain with interposed springs,

Figure 7 shows a cross section of the tyre cover with a chain.

Figure 8 shows a further constructional form of the tyre cover in a similar cross section and Figure 9 shows a spring in cross section.

In the constructional example illustrated in Figures 1 to 4 the tyre cover 1 is provided with a number of grooves 7, spaced apart, which extend both to the tread surface 2 and to the side surfaces of the cover, and which run transversely to the peripheral direction of the tyre on the tread surface and radially on the side surfaces. In both cases, however, the grooves may be inclined, that is to say, they may make an acute angle with the aforementioned directions.

In a number of these grooves are placed short chains 5, which are secured at the ends. These chains are thereby protected against displacement, and project above the tread surface 2 of the tyre cover, so that they can penetrate sufficiently into the snow or the like. The chains however also project beyond the side surfaces of the tyre.

If the grooves 7 are only provided on the side surfaces of the tyre cover or only on its tread surface the chains then lie only in these grooves, whereas where grooves are not provided they bear upon the external surface. In the former case the chains lie quite freely upon the tread surface of the tyre cover. Figure 8 shows the tyre cover with these grooves 7 only on the side surfaces.

The chain ends are preferably secured, with the interposition of tension springs 6, by engaging them in hooks 3, which are secured to a ring 4 of wire or the like, which is known in the case of straight-side tyres and which is embedded in the tyre cover. These hooks are also located in the lateral grooves of the tyre cover, as shown in Figures 3 and 4.

The grooves 7 stressed by the fitting of the chains are indeed not very greatly exposed to wear, owing to the fact that the chains are rather immovably embedded therein, but preferably, by reinforcing this part of the tyre tread by vulcanization, or by means of an insertion of yielding material, such as fibre, jute or the like embedded in the grooves, this possibility of wear is counteracted.

Figures 1 to 4 also show on the tread surface a plurality of shallow grooves 8, which run parallel to the peripheral direction of the tyre, and which prevent lateral slipping, but any other desired construction of the tread surface may be substituted for this. The tyre covers are preferably made thicker on the side walls than has hitherto been usual to enable the lateral extensions of the grooves 7 to be provided, in order to render possible a deeper embedding of the chain members for the purpose of obviating injury thereto when starting the wheel on a lateral obstruction.

In the constructional example illustrated in Figures 5 to 7 there are provided at the ends of the chain hooks 9, preferably of broad flat shape, which are hooked into projections 10, of hook-like construction in cross section, as shown in Figure 7, arranged on the side surfaces of the tyre cover 1. These hooked projections 10 are either only of small breadth or else run round in the form of a beading, as shown in Figure 5.

It is also advantageous to regulate the tension in the helical springs 6 interposed in the chains 5, for the purpose of adapting them to a particular case with a view to obtaining a good seating of the chain on the tyre cover. For this purpose members 11 and 12, which can be screwed into one another are interposed at any convenient point in the chain. According to the example illustrated in Figure 6 the helical spring 6 is connected at one end with the end link 13 of the chain and at the other end with a screw threaded sleeve 12 which is located inside the spring and into which is screwed the bolt 11 carrying the hook 9.

It is also advantageous to regulate or to vary the length of the chains 5 independent of the helical springs 6 for the purpose of adapting the length of each chain to several thicknesses of tire.

It is furthermore advantageous to give the helical spring 6 a flat cross section, as shown in Figure 9, in order to diminish the friction thereof against the tyre cover. It is also an advantage to provide the spring 6 with a coating 14 (Figure 9) of leather, india-rubber, fibre or the like, for the purpose of still further diminishing the said friction.

The aforementioned short chains may be substituted in all cases by any other short, flexible non-skid means resistant against wear, such as in particular belts of leather or rubber.

What I claim is:

1. Non-skid device for wheel tires consisting in the combination of a wheel tire provided with grooves extending transversely to the peripheral direction of the tire, short, flexible non-skid members provided with two ends adapted to be inserted in said grooves, a counter-hook on each end, and hook-like means formed out of the material of the wheel tire at the side surfaces of the tire for securing thereto the two counter-hooks at the ends of the non-skid members.

2. Non-skid device according to claim 1 in which the hook-like means extends in the form of an annular projection all around the wheel tire at each side of the tire.

3. Non-skid device according to claim 1 in which in at least one end of the non-skid member a helical spring and two parts capable of being screwed one into the other are interposed for regulating the length of the non-skid member independent of the spring.

4. Non-skid device for wheel tires consisting in the combination of a wheel tire provided with grooves arranged at the side surfaces thereof, short, flexible non-skid members provided with two ends adapted to be inserted in said grooves, a counter-hook on each end, and hook-like means formed out of the material of the wheel tire at the side surfaces of the tire for securing thereto the two counter-hooks at the ends of the non-skid members.

5. Non-skid device for wheel tires consisting in the combination of a wheel tire provided with grooves extending substantially transversely to the peripheral direction of the tire, short, flexible non-skid members, each member being provided with two ends adapted to be inserted in said grooves, a counter-hook having a broad flat chape on each end and hook like means formed out of the material of the wheel tire at the side surfaces of the tire for securing the two counter-hooks at the ends of each of the non-skid members.

6. A non-skid device including a pneumatic tire portion having grooves extending across the tread and side surfaces thereof, an integral hooked-shaped flange portion formed out of the material of the tire at each side thereof, a chain with its links positioned in the grooves, a device at each end of the chain for fastening said ends to the integral flanges, said device including a member having a screw threaded shank and a broad hooked body portion, a screw threaded sleeve surrounding said shank and a spiral spring surrounding said sleeve with one of its ends fastened to the last link of the chain and its other end seated on the shank against the edge of the sleeve, said shank adapted to be moved inwardly or outwardly of the sleeve independently of the spring for adjusting the length of the chain.

GEORG KIELMANSEGG.